Patented June 10, 1930

1,763,105

UNITED STATES PATENT OFFICE

JOHN P. SLINGER, OF ST. LOUIS, MISSOURI

ART CLAY

No Drawing.    Application filed October 2, 1924.   Serial No. 741,285.

This invention relates to the so-called art clays which are used for various purposes in the art of decorating pottery, ornaments, flowers and various other articles.

One of the objects of this invention is to provide a composition of the character described which is economical to manufacture, which will not readily harden when not exposed to the air, but which will harden when applied and exposed.

Further objects will appear from the detail description in which will be described one embodiment of this invention; it is to be understood, however, that this invention is susceptible of various embodiments.

The clay comprises a suitable mineral body, a binder, a moistener, a preservative and a vaporizable constituent. A suitable mineral body which will harden upon drying is a mixture of commercial whiting (calcium carbonate) and common talc or French chalk (magnesium silicate). These two are particularly useful in combination for the reason that a clay containing whiting alone is liable to be too brittle when set, while one containing talc alone is liable to be too soft. The two in combination provide a tough and rather hard substance when set. A suitable binder is commercial dextrin which also serves the function of water-proofing the whole mass. In order to prevent too rapid hardening, liquid glucose is used as one of the components which also performs the function of holding the powders in suspension. A suitable preservative is formaldehyde which prevents the compound from becoming rancid or moldy. Water is also added so as to provide a workable paste while this water evaporates and leaves the hard substance. A suitable oil, such as sandal-wood oil or wintergreen can be added to give the clay a charactertistic odor.

A suitable art clay having the desired characteristics can be compounded in the following proportions, the parts being by weight except where indicated:

Commercial whiting, 40 parts.
Talc, 14 parts.
Commercial dextrin, 20 parts.
Liquid glucose, 10 parts.
Water, 16 parts.
Formaldehyde, 150 cubic centimeters.
Sandal-wood oil, 14 cubic centimeters.

The above quantities of formaldehyde and sandal-wood oil are added to about fifty pounds of the other ingredients.

In preparing this art clay the whiting, talc and dextrin are thoroughly mixed in order to distribute the components uniformly throughout the mass. To this mixture is then added glucose which is again thoroughly mixed therein, and to the resultant mixture is then added water, and the whole stirred and the formaldehyde and sandal-wood oil are then added. The entire mixture is then stirred for a considerable length of time until it forms a smooth paste, and this paste is placed in cans, sealed and is then ready for use.

The resultant product is one which is well adapted for the purposes for which it is intended. It forms a ready workable paste which can be applied to surfaces with a brush or in any other suitable manner to form the desired covering. Articles, such as paper flowers or leaves, may be dipped therein so as to become coated thereby. After exposure to the air, the paste sets and forms a hard but tough covering.

It is obvious that various changes may be made in details without departing from the spirit of this invention; it is, therefore to be understood that this invention is not to be limited to the specific details described.

Having thus described the invention, what is claimed is:

1. An art clay comprising a hardenable mixture of whiting, talc and dextrin suspended in glucose, and moistened with sufficient water to make a paste.

2. An art clay, comprising, a mixture of a major portion of whiting and a lesser portion of talc with a binder of dextrin and moistened with water to form a paste.

3. An art clay, comprising, a mixture of approximately forty parts of whiting, approximately fourteen parts of talc, approximately twenty parts of dextrin, and approximately ten parts of liquid glucose, together with enough water to form a paste.

4. An art clay comprising a hardenable mixture of whiting, talc and dextrine suspended in glucose and water in suitable proportions to form a paste.

5. An art clay comprising a mixture of whiting, talc and dextrine suspended in glucose, water and formaldehyde in suitable proportions to form a a paste.

6. An art clay comprising a mixture of approximately forty parts of whiting, approximately fourteen parts of talc, approximately twenty parts of dextrine, approximately ten parts of liquid glucose, and sufficient formaldehyde and sandalwood oil to preserve and color the clay, together with enough water to form a paste.

In testimony whereof I affix my signature this 30th day of September, 1924.

JOHN P. SLINGER.